United States Patent
Singleton, IV

(10) Patent No.: US 10,356,621 B2
(45) Date of Patent: Jul. 16, 2019

(54) BROWSER PLUG-IN FOR SECURE WEB ACCESS

(71) Applicant: Citrix Systems, Inc., Fort Lauderdale, FL (US)

(72) Inventor: Leo C. Singleton, IV, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 287 days.

(21) Appl. No.: 15/161,540

(22) Filed: May 23, 2016

(65) Prior Publication Data

US 2017/0339563 A1    Nov. 23, 2017

(51) Int. Cl.
*H04W 12/08* (2009.01)
*H04L 29/08* (2006.01)
(Continued)

(52) U.S. Cl.
CPC .......... *H04W 12/08* (2013.01); *G06F 9/5005* (2013.01); *G06F 16/951* (2019.01); *G06F 16/9566* (2019.01); *H04L 63/083* (2013.01); *H04L 67/02* (2013.01); *H04L 67/10* (2013.01); *H04L 67/2814* (2013.01); *H04W 4/80* (2018.02); *H04L 63/20* (2013.01); *H04L 67/1002* (2013.01)

(58) Field of Classification Search
CPC ......... G06F 17/30864; G06F 17/30867; G06F 17/30887; G06F 9/45533; H04L 63/0227; H04L 63/0245; H04L 63/0281; H04L 63/083; H04L 63/20; H04L 67/02; H04W 12/08
See application file for complete search history.

(56) References Cited

U.S. PATENT DOCUMENTS

2008/0275888 A1    11/2008   Shuster
2010/0192224 A1    7/2010    Ferri et al.
(Continued)

FOREIGN PATENT DOCUMENTS

KR    101459261 B1    11/2014

OTHER PUBLICATIONS

Oct. 25, 2016—(WO) International Search Report and Written Opinion—App PCT/US2016/044643.
(Continued)

*Primary Examiner* — Theodore C Parsons
(74) *Attorney, Agent, or Firm* — Banner & Witcoff, Ltd.

(57) ABSTRACT

Methods, systems, and computer-readable media for a browser plug-in for accessing hosted websites and web applications are presented. The browser plug-in executing within a user web browser application may query a beacon to determine that the user web browser application is executing outside of the secure network. The browser plug-in may receive a request comprising an internal URL for a website executing within the secure network. The browser plug-in may identify one or more policies for the website and use the one or more policies to redirect the user web browser application from the internal URL to an external URL for a hosted web browser application executing within the secure network. As a result, the hosted web browser application may be navigated to the website, and a client agent executing within the user web browser application may present the hosted web browser application.

20 Claims, 8 Drawing Sheets

(51) Int. Cl.
   *H04L 29/06*     (2006.01)
   *G06F 16/951*    (2019.01)
   *G06F 16/955*    (2019.01)
   *G06F 9/50*      (2006.01)
   *H04W 4/80*      (2018.01)

(56) References Cited

U.S. PATENT DOCUMENTS

| | | | |
|---|---|---|---|
| 2012/0069401 A1 | 3/2012 | Fages et al. | |
| 2014/0108496 A1* | 4/2014 | Heller | G06F 17/30864 |
| | | | 709/203 |
| 2014/0258528 A1 | 9/2014 | Miller | |
| 2014/0304766 A1* | 10/2014 | Livne | H04L 63/20 |
| | | | 726/1 |
| 2015/0156203 A1 | 6/2015 | Giura et al. | |
| 2016/0037333 A1* | 2/2016 | Amundsen | H04M 1/72577 |
| | | | 455/419 |
| 2016/0154539 A1 | 6/2016 | Buddhiraja et al. | |
| 2016/0292420 A1 | 10/2016 | Langton et al. | |
| 2016/0294797 A1 | 10/2016 | Martin et al. | |
| 2017/0078406 A1* | 3/2017 | Ruge | H04L 67/146 |
| 2017/0206348 A1 | 7/2017 | Ghosh et al. | |
| 2017/0339250 A1* | 11/2017 | Momchilov | H04L 67/34 |

OTHER PUBLICATIONS

Alberto Rodrigues Da Silva et al. "Web-Based Agent Applications: User Interfaces and Mobile Agents" Telecommunications And IT Convergence Towards SErvice E-Volution; Springer Berlin Heidelberg, Berlin, Heidelberg, pp. 135-153, XP019074179, ISBN: 978-3-540-67152-7 Chapter 2.

Dec. 21, 2017—U.S. Non-final Office Action—U.S. Appl. No. 14/815,066.

Apr. 26, 2018—U.S. Notice of Allowance—U.S. Appl. No. 14/815,066.

* cited by examiner

BROWSER PLUG-IN FOR SECURE WEB ACCESS

FIELD

Aspects described herein generally relate to computers, networking, hardware, and software, and security measures in place therein. More specifically, some aspects herein relate to a browser plug-in for secure web access. One or more aspects of the disclosure relate to accessing hosted web applications, obtaining remote access, and resolving browser compatibility issues by using a web browser plug-in.

BACKGROUND

Enterprises (e.g., corporations, partnerships, governments, academic institutions, other organizations, etc.) face continuously increasing risks of malicious attacks waged against their computer networks and assets. The magnitude and complexity of the situation is further increased by the current trend towards BYOD—bring your own device. BYOD environments allow enterprise employees to use their own devices for work purposes, such as, mobile phones, smartphones, tablets, laptops, personal computers, or other electronic devices, in addition to the computer resources provided by the enterprise. However, BYOD scenarios pose inherent security risks because the enterprise typically lacks uniform and full control over each employee-provided device.

Some enterprises have mitigated the risks described above by deploying and maintaining secure networks that limit access to and from outside of the network (e.g., the Internet), as well as, by using virtualized environments that allow enterprise employees to access non-secure resources from within the secure network in a manner that does not impose a risk on the secure network. Techniques for instantiating an application in a virtualized environment are well known in the art. Such an application may be instantiated on a virtualization server and a counterpart remote application may be rendered on a user's computing device.

A common use of application virtualization is to publish hosted web browser applications. An enterprise may have several motives for publishing hosted web browser applications. Among them, an enterprise may publish a web browser to provide enterprise users with access to websites that would otherwise be inaccessible from within the secure network (e.g., websites that may necessitate Internet access) or websites that have been identified as non-work related or would otherwise pose a security risk to the secure network. For example, a marketing employee may need to access a social media web application for work purposes rather than personal purposes. In another scenario, an enterprise may have implemented a policy to utilize a specific type and version of a web browser application, but one or more employees may need to access a website that is incompatible with the enterprise's approved web browser application. Rather than risk security issues by allowing employees to install an unapproved web browser application, the enterprise may publish hosted web browsers that comprise a type and version that is compatible with the website. For example, an enterprise may have a policy for employees to use the Internet Explorer® web browser application, manufactured by the Microsoft Corporation of Redmond, Wash., yet the application might not be capable of displaying the content of a webpage that is compatible with a CHROME web browser application, manufactured by the Google Corporation of Mountain View, Calif.

However, the user experience of using a hosted web browser may consist of using a different uniform record locator (URL) than the URL of the web application itself. These URL differences may be problematic for users. For example, if a user is working remotely, the user might not be able to open a URL to an internal website (e.g., by clicking on a link) from a machine outside a secure network. In another example, if a user is working from a machine on a secure network (e.g., a corporate network), the user might not be able to access an external website URL. Thus, the user may be prevented from secure web access in order to access various hosted web applications.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards systems, methods, and techniques for a browser plug-in for secure web access of hosted web browser applications. The browser plug-in may redirect uniform record locators (URLs) for websites or web applications to hosted web browsers in order to enhance security by providing an additional level of isolation between end users and web applications.

One or more aspects of the disclosure provide for a method that may include querying, by a browser plug-in executing within a user web browser application, a beacon to determine whether the user web browser application is executing within a secure network; based on the query, determining, by the browser plug-in, that the user web browser application is executing outside of the secure network; receiving, by the user web browser application, a request for a website executing within the secure network, the request comprising an internal uniform record locator (URL); identifying, by the browser plug-in, one or more policies for the website; and based on the one or more policies for the website, redirecting, by the browser plug-in, the user web browser application from the internal URL to an external URL for a hosted web browser application executing within the secure network, wherein the hosted web browser application is navigated to the website and a client agent executing within the user web browser application is configured to present the hosted web browser application.

One or more aspects of the disclosure provide for a method that may include sending, by a user web browser application, user credentials to a secure server for authentication; upon authentication of the user credentials by the secure server, receiving, by a browser plug-in executing within the user web browser application, data indicative of a plurality of websites and one or more policies for each website; receiving, by the browser plug-in, a request for a first website executing within an unsecure network, the request comprising a first internal URL; determining, by the browser plug-in, that the first website matches one of the websites in the plurality of websites; identifying, by the browser plug-in, one or more policies for the first website;

and based on the one or more policies for the first website, redirecting, by the browser plug-in, the user web browser application from the first internal URL to a first external URL for a hosted web browser application executing within the unsecure network, wherein the hosted web browser application is navigated to the first website and a client agent executing within the user web browser application is configured to present the hosted web browser application.

One or more aspects of the disclosure provide for one or more non-transitory computer-readable medium storing computer-executable instructions. The computer-executable instructions, when executed by one or more processors of a data processing system, cause the system to perform querying, by a browser plug-in executing within a user web browser application, a beacon to determine whether the user web browser application is executing within a secure network; based on the query, determining, by the browser plug-in, that the user web browser application is executing outside of the secure network; receiving, by the user web browser application, a request for a website executing within the secure network, the request comprising an internal uniform record locator (URL); identifying, by the browser plug-in, one or more policies for the website; and based on the one or more policies for the website, redirecting, by the browser plug-in, the user web browser application from the internal URL to an external URL for a hosted web browser application executing within the secure network, wherein the hosted web browser application is navigated to the website and a client agent executing within the user web browser application is configured to present the hosted web browser application.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
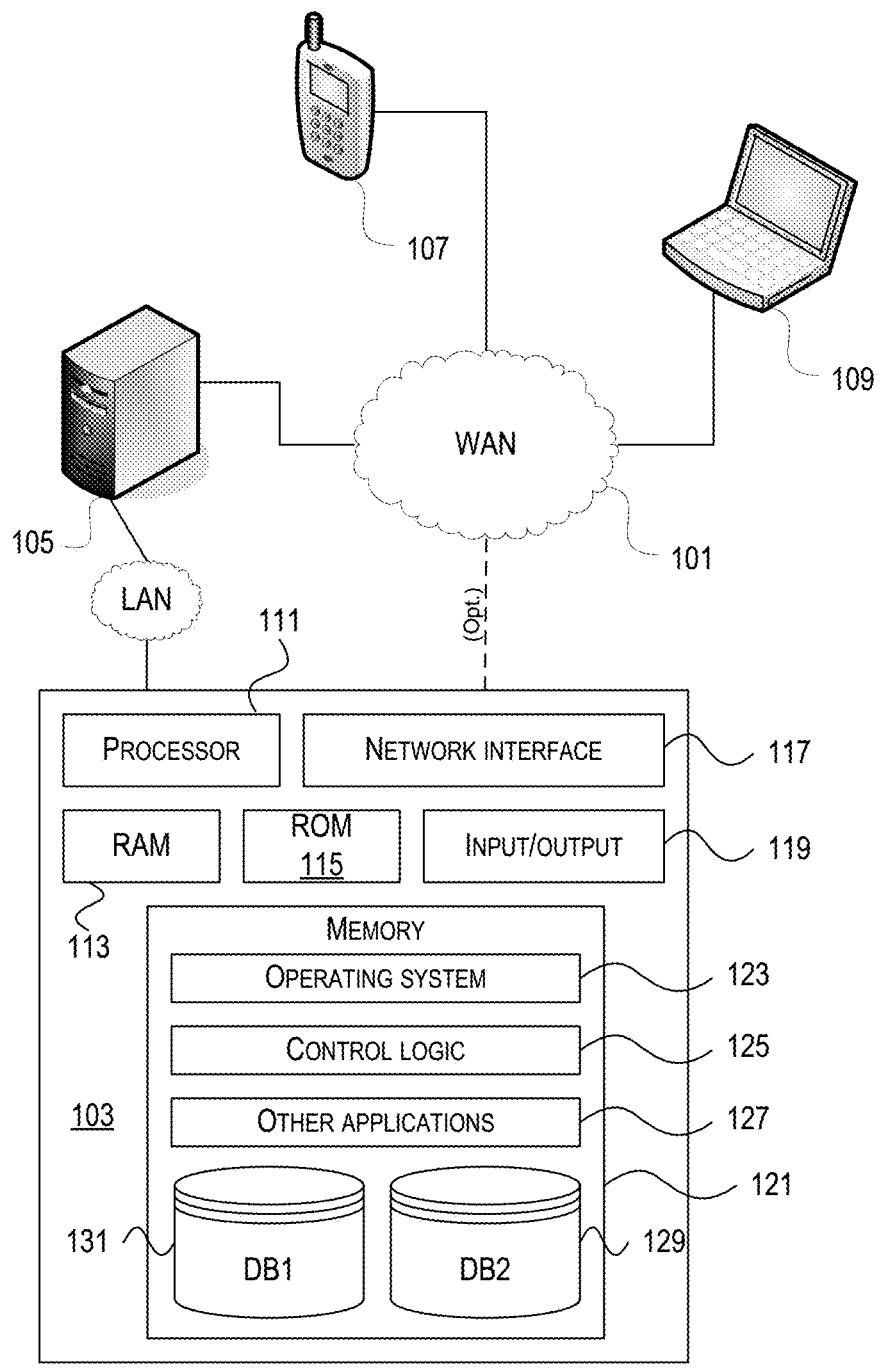
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards systems, methods, and techniques for a secure browser plug-in for accessing hosted web applications. According to aspects described herein, the secure browser plug-in may redirect a web browser from internally-accessible addresses to externally-accessible addresses for websites and web applications and allow users to access the hosted web applications from outside the internal network. In some cases, internally-accessible addresses and externally-available addresses may comprise uniform record locators (URLs) and/or internet protocol (IP) addresses. As described herein, internally-accessible addresses may generally be referred to as "internal URLs"; and externally-accessible addresses may generally be referred to as "external URLs".

The secure browser plug-in as described herein may be used when an employee of an enterprise may need to access an internal website located within the enterprise's secure network while the employee is working remotely from an external network (e.g., an unsecure network). Aspects of the secure browser plug-in described herein may also be used when an employee of an enterprise may need to use a website located outside of the enterprise's secure network (e.g., a marketing employee may need to access a social media web application for work purposes.) Other aspects of the secure browser plug-in described herein may be used to provide access to a website that otherwise might not be accessible due to browser type and/or version compatibility issues.

Before discussing these concepts in greater detail, however, several examples of computing architecture and systems that may be used in implementing and/or otherwise providing various aspects of the disclosure will first be discussed with respect to FIGS. 1-4.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
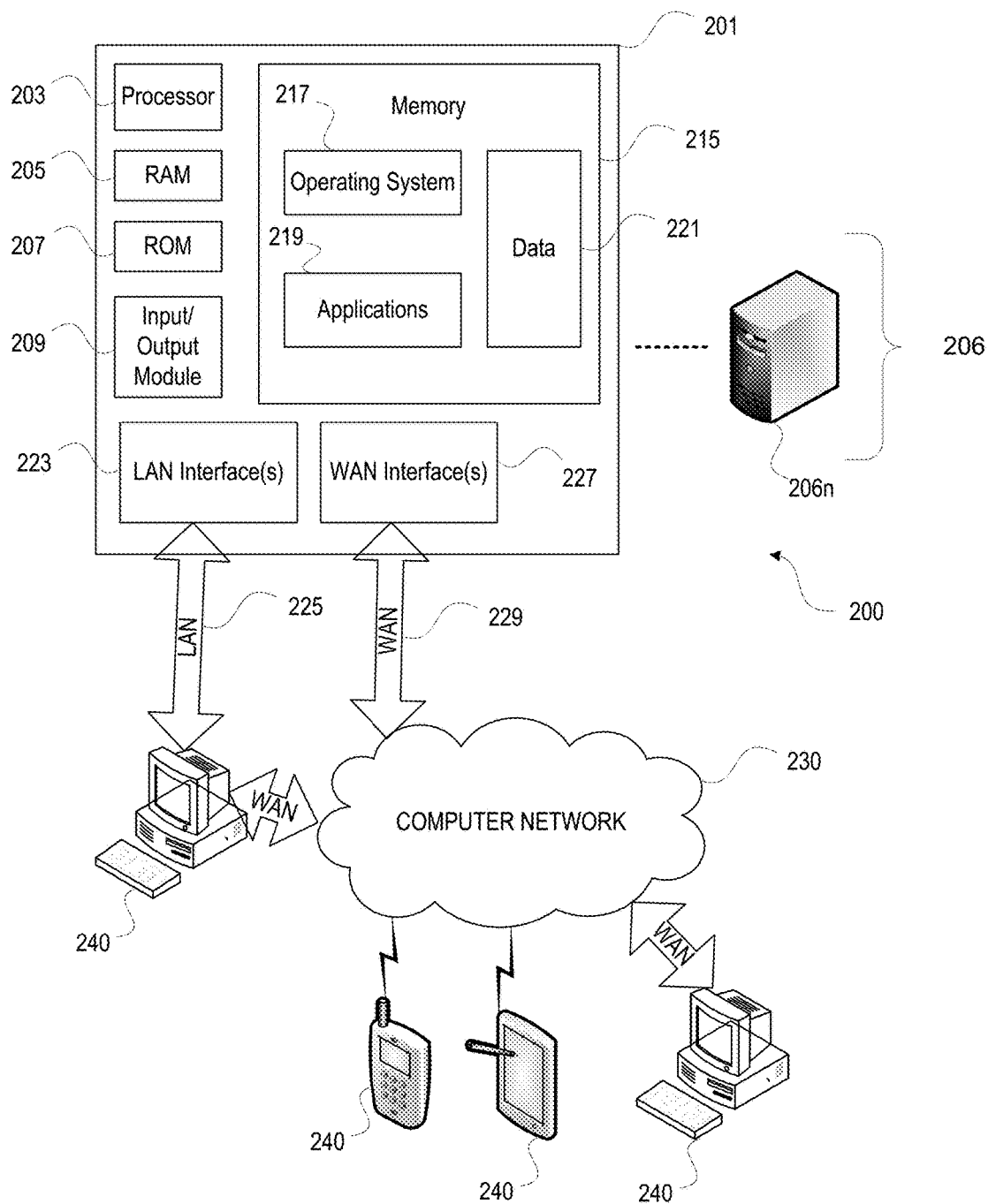
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including RAM 205, ROM 207, I/O module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
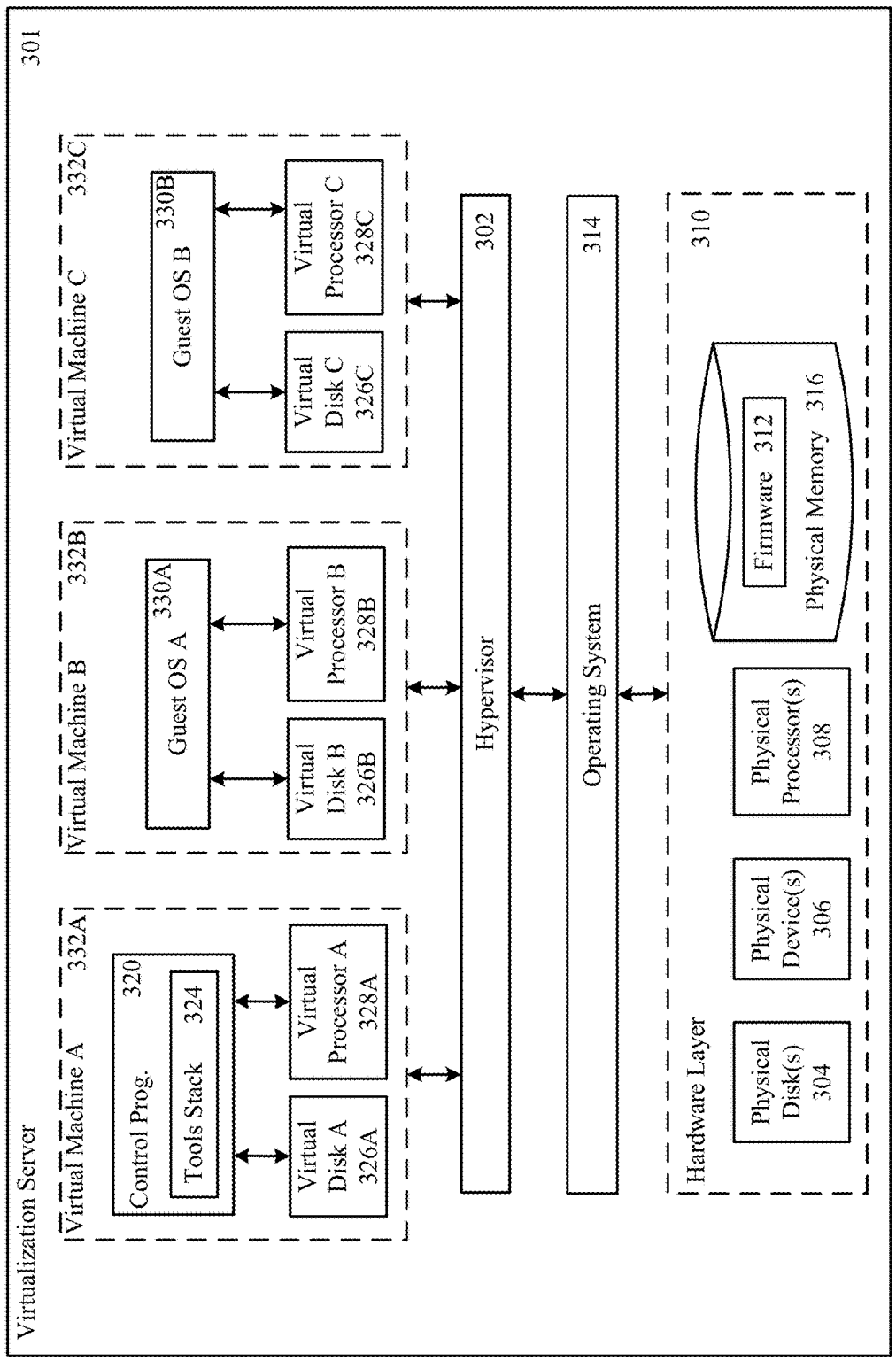
FIG. 3 depicts an illustrative virtualized (hypervisor) system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
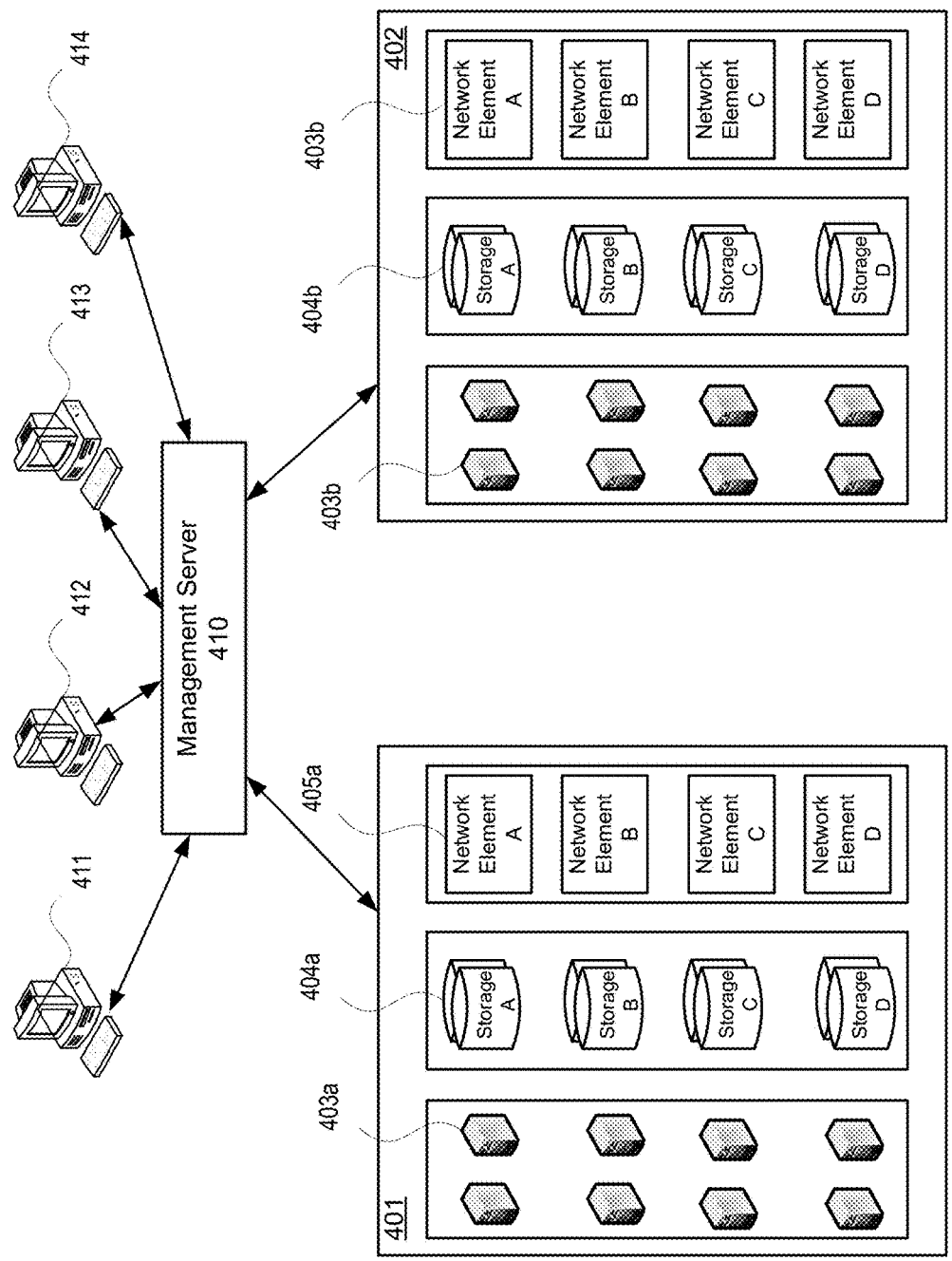
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK by Citrix Systems, Inc. of Ft. Lauderdale, Fla., or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of application programming interfaces (APIs) and/or one or more cloud operator console applications (e.g., web-based on standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management sever 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Wash.), AMAZON EC2 (Amazon.com Inc. of Seattle, Wash.), IBM BLUE CLOUD (IBM Corporation of Armonk, N.Y.), or others.

Secure Browser Plug-In

Having discussed several examples of the computing architecture that may be used in providing and/or implementing various aspects of the disclosure, a number of embodiments will now be discussed in greater detail. In particular, and as introduced above, some aspects of the disclosure generally relate to using a secure browser plug-in to access hosted web browser applications, obtain remote access to secure and/or unsecure websites, and resolve browser compatibility issues. In the description below, various examples illustrating how a secure browser plug-in may redirect addresses (e.g., URLs and/or IP addresses) to hosted web applications may be redirected in accordance with one or more embodiments will be discussed.

Figure 5:
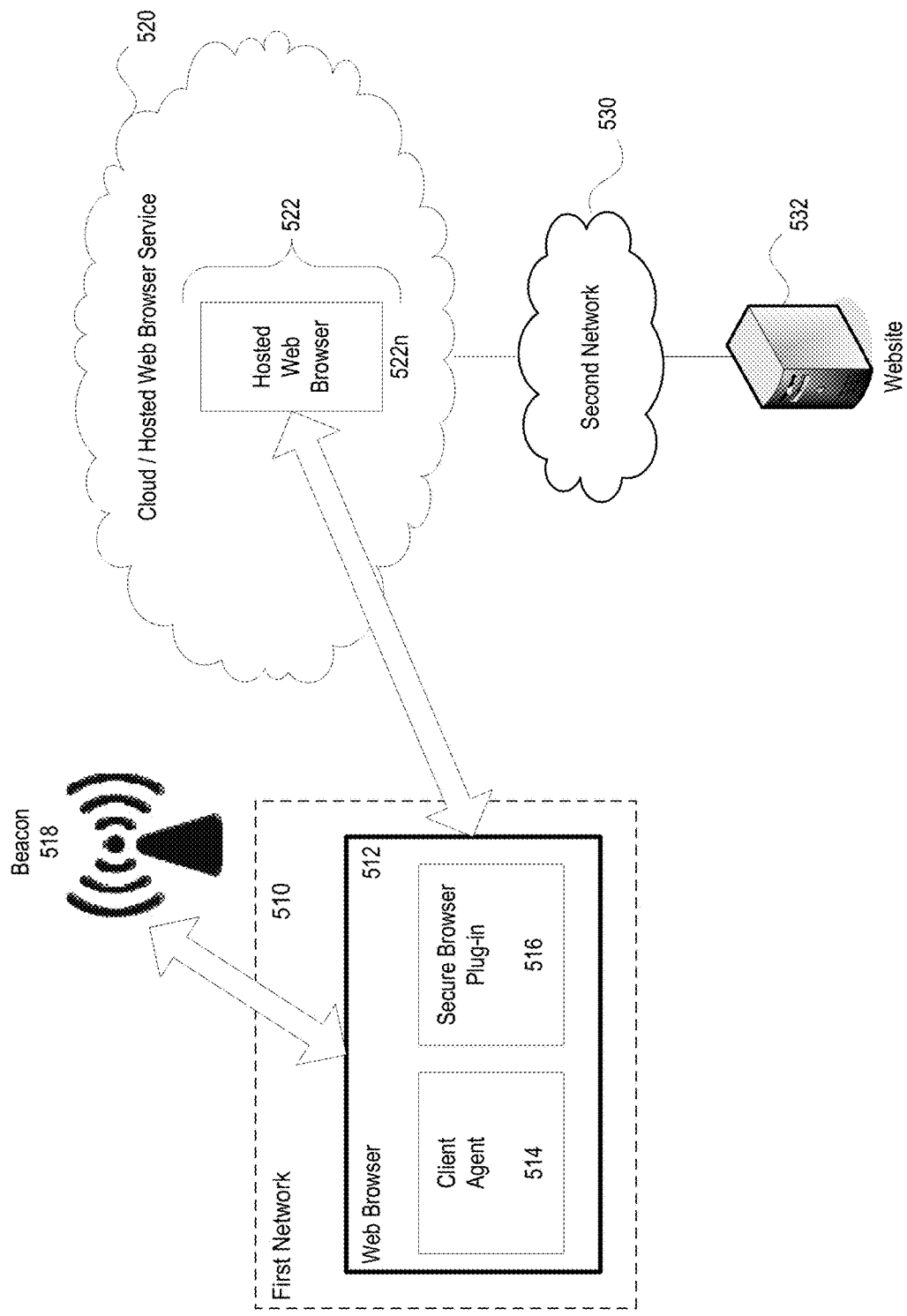
FIG. 5 depicts an illustrative system architecture for a secure browser plug-in for accessing a secure website from a user web browser application executing in an unsecure network according to one or more illustrative aspects described herein.

FIG. 5 shows an illustrative system architecture in which a user web browser application 512 may execute within a first network 510 and access a website 532 in a second network 530. The first network 510 and the second network 530 are for illustration purposes and may be replaced with fewer or additional computer networks.

In some embodiments, the user web browser application 512 may comprise a web browser application executing in a client computing device (e.g., device 109, 240, etc.). The user web browser application 512 may further comprise a client agent 514 and a secure browser plug-in 516. The client agent 514 may comprise a CITRIX® RECEIVER™ brand client agent, which may be utilized to access web applications. For example, the client agent 514 may execute within the user web browser application 512 and may receive and transmit navigation commands from the user web browser application 512 to a hosted web browser application 522. In some embodiments, the client agent 514 may use a remote presentation protocol to display the output generated by the hosted web browser application 522 to the user web browser application 512. For example, the client agent 514 may comprise a HTML5 web client that allows end users to access remote desktops and/or applications on the user web browser application 512.

The secure browser plug-in 516 may comprise a plug-in component, such as an ActiveX control or Java control or any other type and/or form of executable instructions capable of loading into and executing in the user web browser application 512. For example, the secure browser plug-in 516 may comprise an ActiveX control that is loaded and run by a user web browser application 512, such as in the memory space or context of the user web browser application 512. In some embodiments, the secure browser plug-in 516 may be installed as an extension on the user web browser application 512, and a user may choose to enable or disable the plug-in 516.

By using the secure browser plug-in 516, the user web browser application 512 may be able to redirect websites to hosted browsers. For example, a user may be working remotely and may want to access a secure website that is internal to a secure corporate network while the user is working on a computing device connected to an unsecure network. In this case, the user may be utilizing the user web browser application 512 executing in the first network 510, in which the first network 510 may comprise an unsecure network. The website 532 that the user wants to access may be on the second network 530, in which the second network 530 comprises a secure corporate network. The user might not be able to access the secure website 532 from the unsecure first network 510 by clicking on an internal uniform record locator (URL) for the secure website 532. That is, the user may need to utilize a different URL (e.g., an external URL) while executing the user web browser application 512 from the external unsecure network 510. The external URL may be directed to or may address one or more hosted web browser applications 522 configured to access an internal website 532 within the second network 530 (e.g., secure network).

In order to simplify the process for maintaining secure web access, the secure browser plug-in 516 may redirect an internal URL to an external URL for a hosted web application. First, the secure browser plug-in 516 may query a beacon 518 at a predetermined address comprising a uniform record locator (URL) to determine if or when the user web browser application 512 is executing on a secure network or executing on an unsecure network. The beacon 518 may comprise an internal URL available within a secure network, and the beacon 518 may indicate whether or not the user is connected the second network 530 (e.g., secure network).

For example, if the secure browser plug-in 516 receives a response from the beacon 518, then the secure browser plug-in 516 may determine that the user web browser application 512 is executing in a secure network. If or when the user web browser application is executing within a secure network, then the secure browser plug-in 516 might not need to redirect any internal URLs requested because the user may access these internal URLs from the secure network. If or when the secure browser plug-in 516 does not receive a response from the beacon 518, then the secure browser plug-in 516 may determine that the user web browser application 512 is not executing in a secure network and is instead executing in an unsecure network. Thus, the secure browser plug-in 516 may redirect requests to internal URLs to external URLs because the user may be unable to access these internal URLs from the unsecure network.

The beacon 518 may be queried periodically for a predetermined interval of time in order to determine whether the user web browser application 512 may be executing in a secure network (e.g., internal network) or an unsecure network (e.g., an external network). For example, the user may switch back and forth from a secure local area network (LAN) to an unsecure wide area network (WAN), and the secure browser plug-in 516 may be able to detect the network changes to determine whether or not to implement the URL redirection.

Upon querying the beacon 518 and determining that the user web browser application 512 is executing in the unsecure first network 510, the secure browser plug-in 516 may wait to receive a request comprising a URL for a website or web application executing on the secure second network 530. For example, the secure browser plug-in 516 may receive the request in response to a user entering a web address in the user web browser application 512. In some cases, the secure browser plug-in 516 may prompt a user at the user web browser application 512 for user credentials after receiving the request for the secure website 532. For example, the user may enter in his or her credentials, such as a username (e.g., which may comprise an email address) and a password, in order to gain access to the secure website 532. The user credentials may be authenticated by a secure server (not shown), such as a server located within a cloud or hosted web browser service 520. For example, the cloud or hosted web browser service 520 may comprise a single-server or multi-server virtualization system 520 (e.g., a remote access or cloud system) configured to provide virtual machines for web browser applications. A plurality of hosted web browsers 522n may be hosted on and execute in the cloud or hosted web browser service 520. In another example, the plurality of hosted web browser application 522n may be hosted in a server farm of web browser applications.

The cloud or hosted web browser service 520 may authenticate the user credentials received from the secure browser plug-in 516 and provide one or more policies for the hosted web applications to the secure browser plug-in 516. The one or more policies may be configured by an administrator and may comprise one or more rules for redirecting internal URLs to external URLs for web applications.

In some embodiments, the secure browser plug-in 516 may automatically create or configure one or more policies based on the web applications that are published. For example, web applications or websites may be published in the cloud or hosted web browser service 520 and may be available for use by end users. In some cases, the policies may be based on all of the internal web applications that are available in the cloud or hosted web browser service 520. In other embodiments, the secure browser plug-in 516 may utilize a configuration file to set up one or more policies. For example, an administrator may specify a sequence of rules in a configuration file, such as for matching a particular URL, redirecting to a different URL, updating policies, and the like. In some cases, the one or more policies may include minimum browser requirements for certain web applications that may be solely compatible in certain browser types and/or versions. In other cases, the one or more policies may indicate whether or not to access a specific website or web application using a hosted browser at all times, or whether or not to access a specific website or web application using a hosted browser only when the user web browser application 512 is executing on an unsecure network external to the secure corporate network.

An example of a configuration file format is shown in the code below:

```
// JSON format for Secure Browser Extension configuration
{
    "rules" : [
        {
            // Used to match the hostname and port of the
            request. * may be
used as a wildcard:
            // 1. As the leftmost subdomain of the hostname
            // 2. As the port number
            //
            // Wildcards might not be used in any other place in the
hostname, or to perform a partial match of a single
            // subdomain. Rules may not be evaluated in the
            order supplied
in the config file. Instead, if multiple rules
            // match the same hostname/port due to wildcards, the most
specific rule always wins.
            "hostAndPort" : "*.internalsite.net:*",
            // Optional: A regex that is processed against the URL. The
capture groups (created by parentheses) of the regex
            // get passed into the redirect URL.
            "parse" :
" (http|https):\/\/sap\.internalsite\.net:50001\/ ([^?]*)?\*([^#]*) # * (.*
)$/i",
            // The destination URL. Capture groups from the
previous regex
may be inserted using curly brackets, e.g.
            // {1} to insert capture group 1. {1U} means to URL-encode
capture group 1 before inserting it.
            //
            // If this field is null, no rewrite occurs. This feature may be
used for the external browsing use case by
            // whitelisting URLs to _not_ rewrite, then including a catch-all
"hostAndPort": "*:*" rule to redirect external
            // sites to a published web browser.
            "redirect" : "https://launch.cloud.com/. . . .",
            // Tells the Extension whether to process the rule when on the
local network
            "redirectWhenInternal" : false
        }
        //, . . . may repeat with any number of rules
    ],
    // Optional: If the Secure Browser Extension must authenticate with
the server to download configuration, the server
    // may supply an access key to be used with the next configuration
    "nextAccessKey" : "123456",
    // Optional: The number of minutes until the Extension should poll
the server for an updated configuration. If not
    // specified, the Extension assumes a default of 1440 (1 day).
    "refreshInterval" : 60
}
```

The above code for the configuration file format provides examples of matching a hostname and port for an address from a request and redirecting the address to an externally-accessible address when the address is internally-accessible.

In some embodiments, the one or more policies for the secure browser plug-in 516 may be updated periodically over time, such as every hour, every 2 hours, every 24 hours, or another predetermined interval of time. The secure browser plug-in 516 may receive the one or more policies and may implement the policies for hosted web browser access. For example, the secure browser plug-in 516 may identify one or more policies that are specific to the requested secure website 532. Based on the specific policies, the secure browser plug-in 516 may redirect the internal URL received for the secure website 532 to an external URL for a hosted web browser application 522n executing on the second network 530.

Upon redirecting the internal URL to the external URL, the secure browser plug-in 516 may request a hosted web browser application 522n which may be navigated to the website 532 via the second network 530. The secure browser plug-in 516 may further provide a client agent 514 that executes within the user web browser application 512. The client agent 514 may be configured to present the hosted web browser application 522n to the user on the user web browser application 512.

In additional embodiments, the secure browser plug-in 516 may account for browser compatibility issues with various websites and/or web application. That is, the user web browser application 512 might not be able to display the content of the website 532 due to browser type and/or version compatibility issues. In some embodiments, website 532 may thus be referred to as an incompatible website. For example, an Internet Explorer® web browser application, manufactured by the Microsoft Corporation of Redmond, Wash., might not be capable of displaying the content of a webpage that is only compatible with a CHROME web browser application, manufactured by the Google Corporation of Mountain View, Calif. Similarly, Internet Explorer® version 10 might not be capable of displaying the content of a webpage that is only compatible with Internet Explorer® version 8, manufactured by the Microsoft Corporation of Redmond, Wash. In another example, Google CHROME might not support or may discontinue support for NPAPI-based plug-ins, and therefore another browser might be required to access a web site that utilizes such plug-ins. Thus, the secure browser plug-in 516 may redirect an internal URL for a requested website to an external URL for a hosted web browser application 522 and may further determine a type and version of the hosted web browser application 522 to launch in response to the request for the website. For example, the secure browser plug-in 516 may retrieve content and properties of the requested website (e.g., incompatible website 532), analyze the content and properties of the requested website, and determine a type and version of a hosted compatible web browser application 522 to request from the hosted web browser service 520.

FIG. 5 illustrates just one example of a network architecture that may be used, and those of skill in the art will appreciate that the specific network architecture and data processing devices used may vary, and are secondary to the functionality that they provide, as further described herein. In some embodiments, the system architecture of FIG. 5 may also include a Domain Name System (DNS) DNS server for providing network addresses including Internet protocol (IP) addresses or uniform record locator (URL) addresses, or any other usable web site addresses. Ultimately, the secure browser plug-in may simplify and enhance a user's experience, such as by a user not needing to have multiple sets of bookmarks to navigate to different URLs for internal and external access. The secure browser plug-in may also allow administrators to configure policies for redirection for the end users, such that the end users do not have to configure the policies themselves. Furthermore, the secure browser plug-in may also implement network detection through use of a beacon, so that the plug-in may function differently when a user is on an internal secure network versus an external unsecure network.

Figure 6:
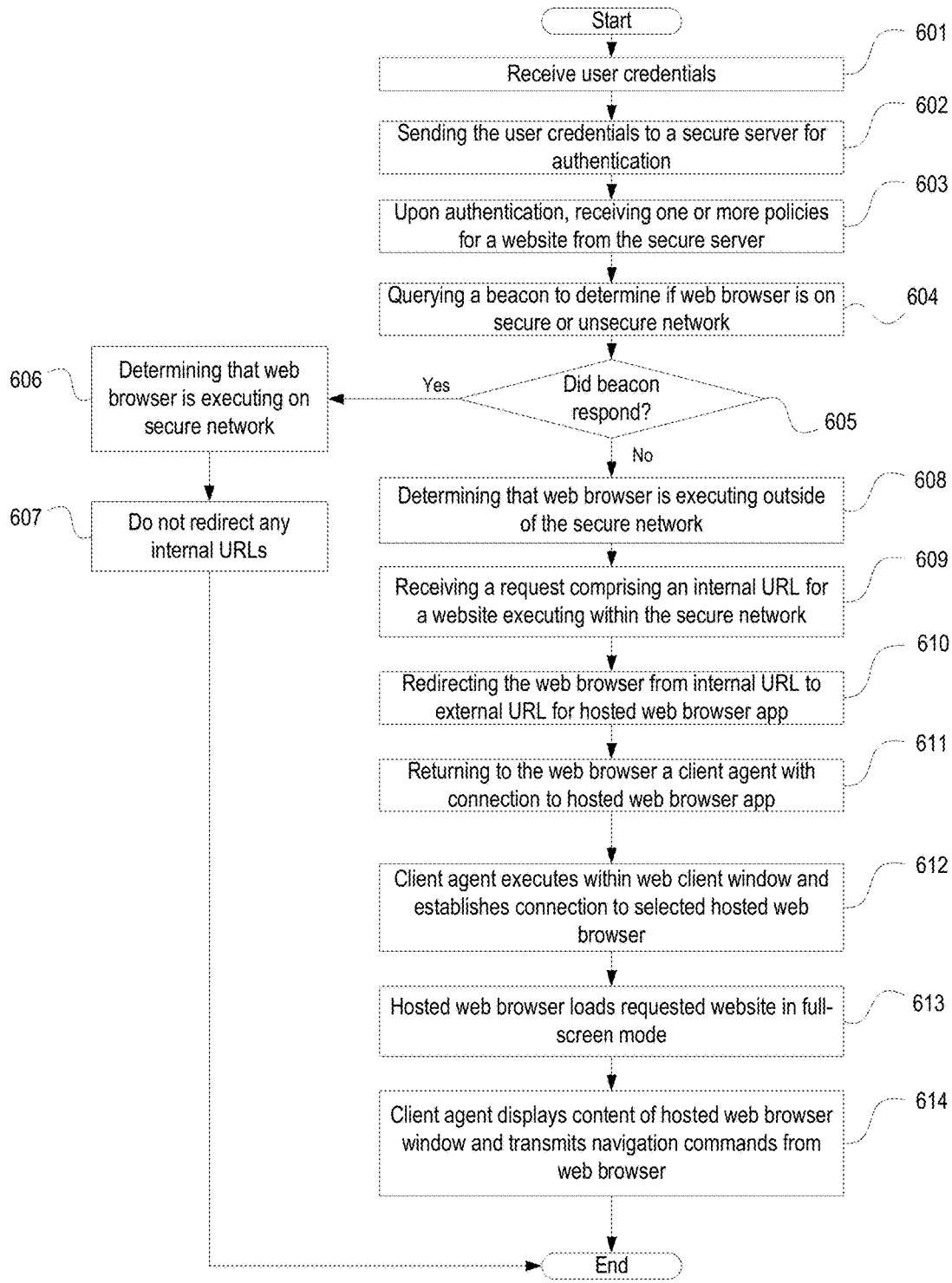
FIG. 6 illustrates a flow chart of a method used to redirect a user web browser application executing in an unsecure network to a hosted web browser application presenting a website in a secure network in accordance with one or more illustrative aspects described herein.

FIG. 6 depicts a flowchart that illustrates a method of using a secure browser plug-in to redirect a user web browser application executing in an unsecure network to a hosted web browser application that provides access to a website in a secure network. The algorithm shown in FIG. 6 and other similar examples described herein may be performed in a computing environment such as the system illustrated in FIG. 5, as well as other systems having different architectures (e.g., all or part of FIGS. 1-4). In other embodiments, the method illustrated in FIG. 6 and/or one or more steps thereof may be embodied in a computer-readable medium, such as a non-transitory computer readable memory.

At step 601, the user web browser application 512 may receive user credentials from a user. In some cases, the user web browser application 512 may prompt a user for user credentials, and the user may enter in his or her credentials, such as a username (e.g., which may comprise an email address) and a password, in order to gain access to a website or web application. At step 602, the user web browser application 512 may send the user credentials to a secure server for authentication. For example, the user credentials may be authenticated by a secure server, such as a server within a cloud or hosted web browser service 520. At step 603, the user web browser application 512 and the secure browser plug-in 516 may receive confirmation that the user credentials have been authenticated, as well as one or more policies from the secure server for a plurality of websites and/or web applications. For example, the one or more policies may be configured by an administrator and may comprise one or more rules for redirecting internal URLs to external URLs for websites and/or web applications.

At step 604, the secure browser plug-in 516 may query a beacon 518 to determine whether the user web browser application 512 is executing on a secure network 530 or on an unsecure network 510. For example, a user may be utilizing the user web browser application 512 remotely on an unsecure network 510 or the user may be utilizing the user web browser application 512 on a secure corporate network 530. The secure browser plug-in 516 may transmit an echo or ping message to a beacon 518 at a predetermined address to identify if the beacon is accessible. In other embodiments, the secure browser plug-in 516 may use other methods to determine whether the beacon may be reachable. For example, the secure browser plug-in 516 may communicate with a domain name server (DNS) to determine whether the beacon 518 may be addressable. In yet another embodiment, the secure browser plug-in 516 may use an Internet Control Message Protocol (ICMP) to determine whether the beacon may be reached. At step 605, the secure browser plug-in 516 may determine if the beacon 518 responded to the query. If or when the secure browser plug-in 516 has received a response from the beacon 518, then the secure browser plug-in 516 may determine that the user web browser application 512 is executing on the secure network 530, as shown in step 606. Thus, at step 607, the secure browser plug-in 516 may determine not to redirect any internal URLs requested because the user web browser application 512 may be executing on the secure network 530, and the method ends.

If or when the secure browser plug-in 516 does not receive a response from the beacon 518 after a predetermined amount of time has elapsed, then the secure browser plug-in 516 may determine that the user web browser application 512 is executing outside of the secure network 530, as shown in step 608. For example, the user web browser application 512 may be executing on an unsecure network 510. The secure browser plug-in 516 may be able to implement network detection in order to identify whether or not to redirect internal URLs to external URLs. At step 609, the user web browser application 512 may receive a request comprising an internal URL for a website executing within the secure network. For example, the user web browser application 512 may receive the request in response to a user entering a web address (e.g., for secure website 532) in the web browser application 512. At step 610, the secure browser plug-in 516 may redirect the user web browser application 512 from the internal URL to an external URL for a hosted web browser application. For example, the secure browser plug-in 516 may replace the internal URL with an external URL for the hosted web browser application 522 executing within the secure network 530.

At step 611, the secure browser plug-in 516 may allow a client agent 514 to be connected to the hosted web browser application 522. The client agent 514 may comprise a plugin component, such as an ActiveX control or Java control or any other type and/or form of executable instructions capable of loading into and executing in the user web browser application 512. For example, the client agent 514 may comprise an ActiveX control loaded and run by a user web browser application 512, such as in the memory space or context of the user web browser application 512. The client agent 514 may be pre-configured to present the content of the hosted web browser application 522 within the user web browser application 512.

At step 612, the client agent 514 may connect to a server or the cloud/hosted web browser service 520 using a thin-client or remote-display protocol to present display output generated by the hosted web browser application 522 executing on the service 520. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

At step 613, the hosted web browser application 522 may navigate to the requested secure website 532 in full-screen mode. At step 614, the client agent 514 may present the content of the secure website 532 on the user web browser application 512 in a seamless and transparent manner such that it appears that the content is being displayed by the user web browser application 512, e.g., based on the content being displayed in full screen mode. In other words, the user may be given the impression that the website content is displayed by the user web browser application 512 and not by the hosted web browser application 522. The client agent 514 may transmit navigation commands generated by the user web browser application 512 to the hosted web browser application 522 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Figure 7:
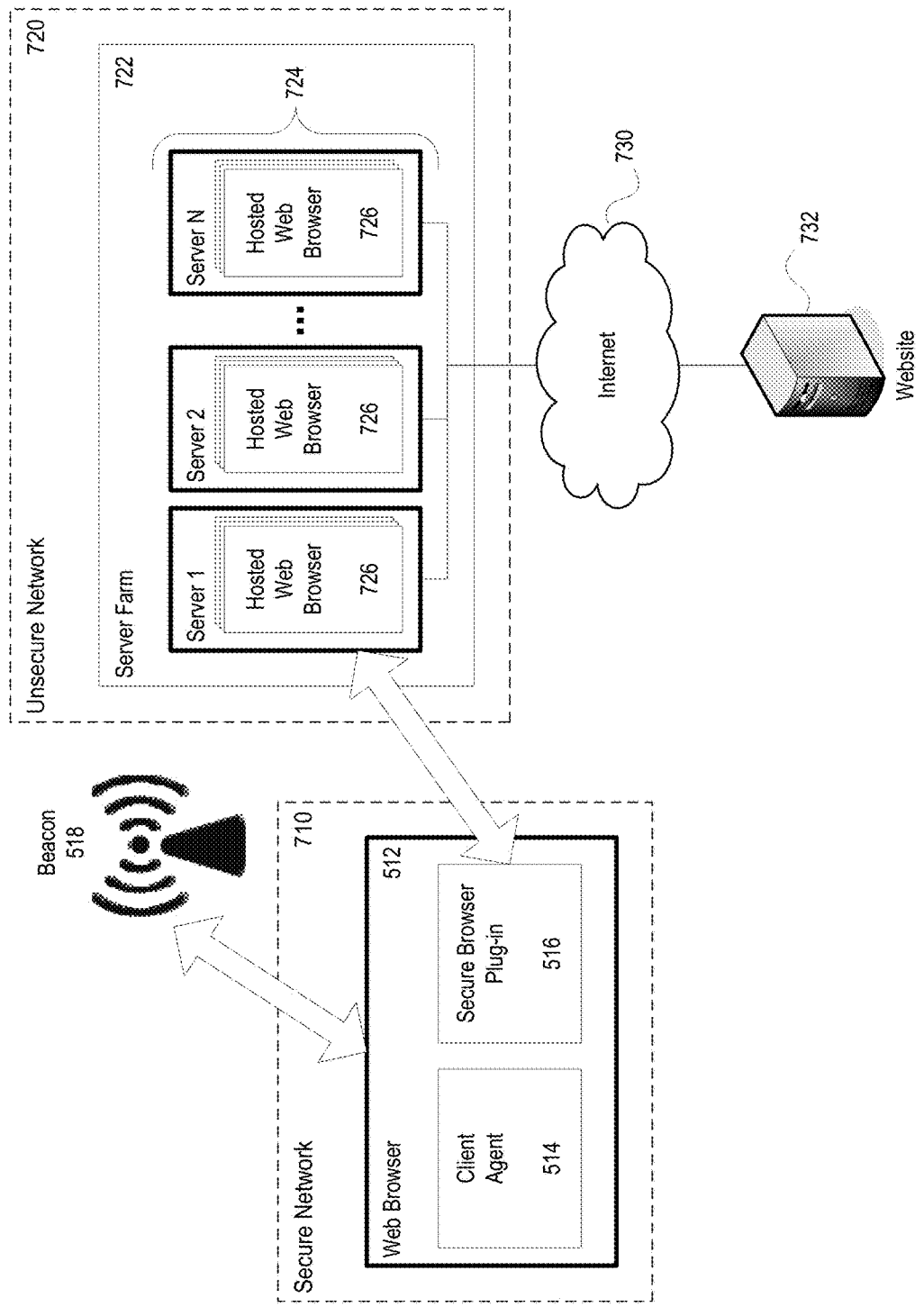
FIG. 7 depicts an illustrative system architecture for a secure browser plug-in for accessing an unsecure website from a user web browser application executing in a secure network, in accordance with one or more illustrative aspects described herein.

FIG. 7 shows an illustrative system architecture in which a user web browser application 512 may execute within a secure network 710 and access a website 732 in an unsecure network 720. The secure network 710 and the unsecure network 730 are for illustration purposes and may be replaced with fewer or additional computer networks.

In some embodiments, the user web browser application 512 may comprise a web browser application executing in a client computing device (e.g., device 109, 240, etc.). The user web browser application 512 may further comprise a client agent 514 and a secure browser plug-in 516. The client agent 514 may comprise a CITRIX® RECEIVER™ brand client agent, which may be utilized to access web applications. For example, the client agent 514 may execute within the user web browser application 512 and may receive and transmit navigation commands from the user web browser application 512 to a hosted web browser application 726. In some embodiments, the client agent 514 may use a remote presentation protocol to display the output generated by the hosted web browser application 726 to the user web browser application 512. For example, the client agent 514 may comprise a HTML5 web client that allows end users to access remote desktops and/or applications on the user web browser application 512.

The secure browser plug-in 516 may comprise a plug-in component, such as an ActiveX control or Java control or any other type and/or form of executable instructions capable of loading into and executing in the user web browser application 512. For example, the secure browser plug-in 516 may comprise an ActiveX control that is loaded and run by a user web browser application 512, such as in the memory space or context of the user web browser application 512. In some embodiments, the secure browser plug-in 516 may be installed as an extension on the user web browser application 512, and a user may choose to enable or disable the plug-in 516.

By using the secure browser plug-in 516, the user web browser application 512 may be able to access websites or web applications that are external to a secure corporate network 710. For example, a user may want to access an external website (e.g., a website outside of a secure corporate network) that is in an unsecure network while the user is working on a computing device connected to a secure network. In this case, the user may be utilizing the user web browser application 512 executing in the secure network 710, and the website 732 that the user wants to access may be on the unsecure network 720. The user might not be able to access the unsecure website 732 from the secure network 710 by clicking on a uniform record locator (URL) for the unsecure website 732. That is, certain websites might not be permitted for access on the secure network 710, and the user may need to utilize a different URL while executing the user web browser application 512 from the secure network 710.

Therefore, in order to enhance security and provide a level of isolation between end users and external websites, the secure browser plug-in 516 may redirect an external URL for an unsecure website 732 to an internal URL for a hosted web application (e.g. hosted web browser application 726) upon determining if the unsecure website 732 matches one of the websites that a user is allowed to access while on the secure network 710. For example, the secure browser plug-in 516 may receive data indicative of a plurality of websites and one or more policies for each website. The plurality of websites may comprise external websites that have been approved for access by users on the internal secure network 710. The one or more policies for these websites may be configured by an administrator and may comprise one or more rules for redirecting the external URLs to the internal URLs for websites and/or web applications. Upon identifying that the website 732 has been approved for access, the secure browser plug-in 516 may redirect a URL based on the one or more policies for the website 732.

In some cases, the secure browser plug-in 516 may prompt a user at the user web browser application 512 for user credentials after receiving a request for the unsecure website 732. For example, the user may enter in his or her credentials, such as an email address and password, and the user credentials may be authenticated by a secure server in the secure network 710. After authenticating and determining that the first website 732 matches one of the approved websites, the secure browser plug-in 516 may redirect the user web browser application 512 from the URL for the first website 732 to an internal URL for a hosted web browser application 726.

The hosted web browser application 726 may be hosted on a server 724 in a single-server or multi-server virtualization system (e.g., a remote access or cloud system) configured to provide virtual machines for web browser applications. In one embodiment, the hosted web browser application 726 may be launched in response to the secure browser plug-in 516 redirecting the user web browser application 512 from the URL for the website 732 to an internal URL. In another embodiment, server farm 722 may have pre-launched a set of one or more hosted web browser applications 726*n*, and one of the pre-launched hosted web browser applications 726*n* may be assigned in response to a request from the user web browser 726. The selected hosted web browser application 726 may navigate to the unsecure website 732 via a network 70 (e.g., which may be the same as Internet 730.)

The secure browser plug-in 516 may further provide client agent 514 that executes within the user web browser application 512. The client agent 514, e.g., a client agent such as CITRIX RECEIVER, may use a remote presentation protocol to display the output generated by the hosted web browser application 726 to the user web browser application 512. The client agent 514 may also transmit navigation commands from the user web browser application 512 to the hosted web browser application 726.

In additional embodiments, the secure browser plug-in 516 may account for browser compatibility issues with various websites and/or web application. That is, the user web browser application 512 might not be able to display the content of the website 732 due to browser type and/or version compatibility issues. In some embodiments, website 732 may thus be referred to as an incompatible website. For example, an Internet Explorer® web browser application, manufactured by the Microsoft Corporation of Redmond, Wash., might not be capable of displaying the content of a webpage that is only compatible with a CHROME web browser application, manufactured by the Google Corporation of Mountain View, Calif. Similarly, Internet Explorer® version 10 might not be capable of displaying the content of a webpage that is only compatible with Internet Explorer® version 8, manufactured by the Microsoft Corporation of Redmond, Wash. In another example, Google CHROME might not support or may discontinue support for NPAPI-based plug-ins, and therefore another browser might be required to access a web site that utilizes such plug-ins. Thus, the secure browser plug-in 516 may redirect an external URL for a requested website to an internal URL for a hosted web browser application 726 and may further determine a type and version of the hosted web browser application 726 to launch in response to the request for the website. For example, the secure browser plug-in 516 may retrieve content and properties of the requested website (e.g., incompatible website 732), analyze the content and properties of the requested website, and determine a type and version of a hosted compatible web browser application 726 to request from the server 724.

Figure 8:
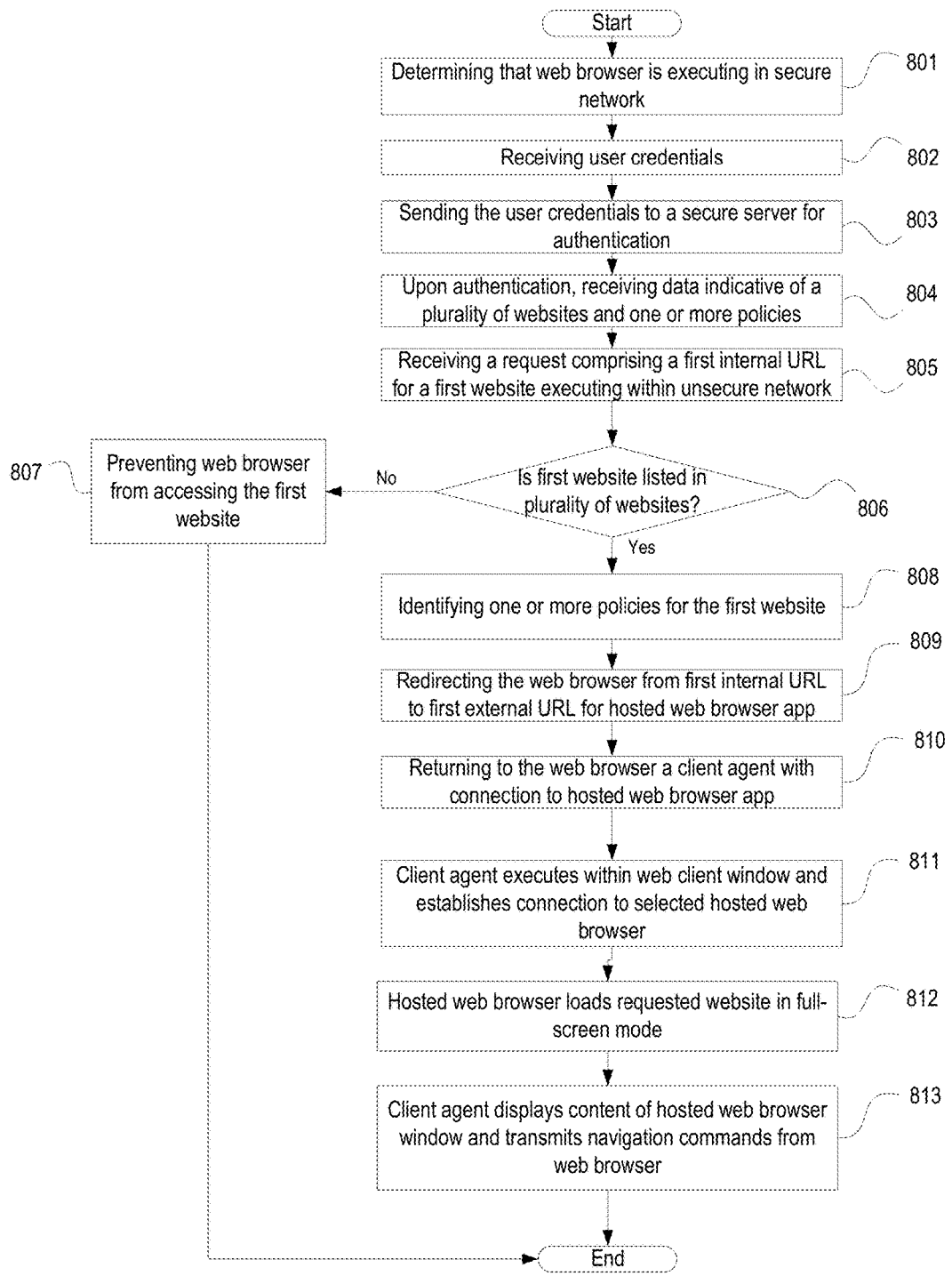
FIG. 8 illustrates a flow chart of a method used to redirect a user web browser application executing in a secure network to a hosted web browser application presenting a website in an unsecure network in accordance with one or more illustrative aspects described herein.

FIG. 8 depicts a flowchart that illustrates a method of using a secure browser plug-in to redirect a user web browser application executing in a secure network to a hosted web browser application that provides access to a website in an unsecure network. The algorithm shown in FIG. 8 and other similar examples described herein may be performed in a computing environment such as the system illustrated in FIG. 7, as well as other systems having different architectures. In other embodiments, the method illustrated in FIG. 8 and/or one or more steps thereof may be embodied in a computer-readable medium, such as a non-transitory computer readable memory.

In step 801, the secure browser plug-in 516 may determine that a user web browser application 512 is executing on a secure network 710. For example, the secure browser plug-in 516 may query a beacon 518 at a predetermined URL and receive a response from the beacon 518 indicating that the user web browser application 512 is executing on the secure network 710. At step 802, the user web browser application 512 may receive user credentials. In some cases, the user web browser application 512 may prompt a user for user credentials, and the user may enter in his or her credentials, such as an email address and password. At step 803, the user web browser application 512 may send the user credentials to a secure server for authentication. For example, the user credentials may be authenticated by a secure server within the secure network 710. At step 804, the user web browser application 512 and the secure browser plug-in 516 may receive confirmation that the user credentials have been authenticated, and the secure browser plug-in 516 may also receive data indicative of a plurality of websites and one or more policies for each website. For example, the plurality of websites may include one or more websites (e.g., website 732) executing within an unsecure network 720, and each website in the plurality of websites may comprise an internal URL and an external URL. The plurality of websites may comprise external websites that have been approved for access by users on an internal secure network. The one or more policies for these websites may be configured by an administrator and may comprise one or more rules for redirecting the internal URLs to the external URLs for websites and/or web applications.

At step 805, the user web browser application 512 and the secure browser plug-in 516 may receive a request comprising a first URL for a first website executing within the unsecure network. For example, the user web browser application 512 may receive the request in response to a user entering a web address (e.g., for unsecure website 732) in the browser. At step 806, the secure browser plug-in 516 may determine if the first website matches one of the websites in the plurality of websites. If the first website does not match one of the websites in the plurality of websites, then the secure browser plug-in 516 prevents the user web browser application 512 from accessing the first website, as shown in step 807, and the method ends. If the first website matches one of the websites in the plurality of websites, then the secure browser plug-in 516 identifies one or more policies for the first website, as shown in step 808. Based on the one or more policies for the first website, at step 809, the secure browser plug-in 516 may redirect the user web browser application 512 from the first internal URL to a first external URL for a hosted web browser application. For example, the secure browser plug-in 516 may rewrite the internal URL to an external URL for the hosted web browser application 726 executing within the unsecure network 730.

At step 810, the secure browser plug-in 516 may allow a client agent 514 to be connected to the hosted web browser application 726. The client agent 514 may comprise a plugin component, such as an ActiveX control or Java control or any other type and/or form of executable instructions capable of loading into and executing in the user web browser application 512. For example, the client agent 514 may comprise an ActiveX control loaded and run by a user web browser application 512, such as in the memory space or context of the user web browser application 512. The client agent 514 may be pre-configured to present the content of the hosted web browser application 726 within the user web browser application 512.

At step 811, the client agent 514 may connect to a server 724 using a thin-client or remote-display protocol to present display output generated by the hosted web browser application 726 executing on the server 724. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

At step 812, the hosted web browser application 522 may navigate to the requested first website 732 in full-screen mode. At step 813, the client agent 514 may present the content of the first website 732 on the user web browser application 512 in a seamless and transparent manner such that it appears that the content is being displayed by the user web browser application 512, e.g., based on the content being displayed in full screen mode. In other words, the user may be given the impression that the website content is displayed by the user web browser application 512 and not by the hosted web browser application 726. The client agent 514 may transmit navigation commands generated by the user web browser application 512 to the hosted web browser application 726 using the thin-client or remote-display protocol. Changes to the display output of the hosted web browser application 522, due to the navigation commands, may be reflected in the user web browser application 512 by the client agent 514, giving the impression to the user that the navigation commands were executed by the user web browser application 512.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
    querying, by a browser plug-in executing within a user web browser application, a beacon to determine whether the user web browser application is executing within a secure network;
    based on the query, determining, by the browser plug-in, that the user web browser application is executing outside of the secure network;
    receiving, by the user web browser application, a request for a website executing within the secure network, the request comprising an internal uniform record locator (URL);
    identifying, by the browser plug-in, one or more policies for the website, wherein the one or more policies for the website are stored locally at a user device configured to operate the browser plug-in; and based on the one or more policies for the website, redirecting, by the browser plug-in, the user web browser application from the internal URL to an external URL for a hosted web browser application executing within the secure network, wherein the hosted web browser application is navigated to the website and a client agent executing within the user web browser application is configured to present the hosted web browser application.

2. The method of claim 1, wherein determining that the user web browser application is executing outside the secure network further comprises failing to receive a response from the beacon, and wherein the user web browser application is executing within an unsecure network.

3. The method of claim 1, wherein the one or more policies are configured by an administrator and comprise one or more rules for redirecting internal URLs to external URLs for websites.

4. The method of claim 1, further comprising, prior to identifying the one or more policies:

receiving, by the user web browser application, user credentials comprising an email address and password for a user;

sending, by the user web browser application, the user credentials to a secure server for authentication; and upon authentication of the user credentials by the secure server, obtaining the one or more policies for the website from the secure server.

5. The method of claim 1, further comprising, responsive to redirecting the internal URL to the external URL for the hosted web browser application:

retrieving content and properties of the website;
analyzing the content and properties of the website; and
determining, based on the content and properties of the website, a type and version of the hosted web browser application to launch in response to the request for the website.

6. The method of claim 1, wherein the beacon is queried periodically to determine whether the user web browser application is executing within the secure network, and wherein the beacon is available on the secure network.

7. The method of claim 1, further comprising automatically generating, by the browser plug-in, the one or more policies for the website based on a published web application corresponding to the external URL.

8. The method of claim 1, further comprising automatically generating, by the browser plug-in, the one or more policies for the website based on a configuration file that includes a set of rules for performing URL redirection.

9. The method of claim 1, wherein the one or more policies for the website indicate that the user web browser application is permitted to access the external URL when the user web browser application is executing outside of the secure network but is not permitted to access the external URL when the user web browser application is executing within the secure network.

10. The method of claim 1, wherein the user web browser application is configured to present the hosted web browser application in a full screen mode, without presenting an indication that the hosted web browser application is being presented.

11. A method comprising:

sending, by a user web browser application, user credentials to a secure server for authentication;

upon authentication of the user credentials by the secure server, receiving, by a browser plug-in executing within the user web browser application, data indicative of a plurality of websites and one or more policies for each website;

receiving, by the browser plug-in, a request for a first website executing within an unsecure network, the request comprising a first internal URL;

determining, by the browser plug-in, that the first website matches one of the websites in the plurality of websites;

identifying, by the browser plug-in, one or more policies for the first website, wherein the one or more policies for the first website are stored locally at a user device configured to operate the browser plug-in; and based on the one or more policies for the first web site, redirecting, by the browser plug-in, the user web browser application from the first internal URL to a first external URL for a hosted web browser application executing within the unsecure network, wherein the hosted web browser application is navigated to the first website and a client agent executing within the user web browser application is configured to present the hosted web browser application.

12. The method of claim 11, further comprising:

querying, by the browser plug-in executing within the user web browser application, a beacon to determine whether the user web browser application is executing within a secure network; and determining, by the browser plug-in, that the user web browser application is executing within the secure network based on receiving a response to the query from the beacon.

13. The method of claim 12, wherein the beacon is queried periodically to determine whether the user web browser application is executing within the secure network, and wherein the beacon is available on the secure network.

14. The method of claim 11, wherein the one or more policies are configured by an administrator and comprise one or more rules for redirecting each website in the plurality of websites from an internal URL to an external URL.

15. The method of claim 11, further comprising, responsive to redirecting the first internal URL to the first external URL for the hosted web browser application:

retrieving content and properties of the first website;
analyzing the content and properties of the first website; and
determining, based on the content and properties of the first website, a type and version of the hosted web browser application to launch in response to the request for the first website.

16. One or more non-transitory computer-readable medium storing computer-executable instructions that, when executed by one or more processors of a data processing system, cause the data processing system to:

query, by a browser plug-in executing within a user web browser application, a beacon to determine whether the user web browser application is executing within a secure network;

based on the query, determine, by the browser plug-in, that the user web browser application is executing outside of the secure network;

receive, by the user web browser application, a request for a website executing within the secure network, the request comprising an internal uniform record locator (URL);

identify, by the browser plug-in, one or more policies for the website, wherein the one or more policies for the website are stored locally at the data processing system; and based on the one or more policies for the website, redirect, by the browser plug-in, the user web browser application from the internal URL to an external URL for a hosted web browser application executing within the secure network, wherein the hosted web browser application is navigated to the website and a client agent executing within the user web browser application is configured to present the hosted web browser application.

17. The one or more non-transitory computer-readable medium of claim 16, wherein:
determining that the user web browser application is executing outside the secure network further comprises failing to receive a response from the beacon, and wherein the user web browser application is executing within an unsecure network.

18. The one or more non-transitory computer-readable medium of claim 16, wherein the one or more policies are configured by an administrator and comprise one or more rules for redirecting internal URLs to external URLs for websites.

19. The one or more non-transitory computer-readable medium of claim 16, having additional computer-executable instructions stored thereon that, when executed by the one or more processors, further cause the data processing system to:

receive, by the user web browser application, user credentials comprising an email address and password for a user;

send, by the user web browser application, the user credentials to a secure server for authentication; and upon authentication of the user credentials by the secure server, obtain the one or more policies for the website from the secure server.

20. The one or more non-transitory computer-readable medium of claim 16, having additional computer-executable instructions stored thereon that, when executed by the one or more processors, further cause the data processing system to:

responsive to redirecting the internal URL to the external URL for the hosted web browser application, retrieve content and properties of the website;

analyze the content and properties of the website; and determine, based on the content and properties of the website, a type and version of the hosted web browser application to launch in response to the request for the website.

* * * * *